United States Patent [19]
Jorgensen

[11] Patent Number: 5,682,976
[45] Date of Patent: Nov. 4, 1997

[54] GUIDE RAIL SUPPORTS FOR CONVEYORS AND THE LIKE

[75] Inventor: Morell L. Jorgensen, Honeoye, N.Y.

[73] Assignee: Philip K. Fitzsimmons, Rochester, N.Y.

[21] Appl. No.: 715,754

[22] Filed: Sep. 19, 1996

[51] Int. Cl.$^6$ ............................................. B65G 21/20
[52] U.S. Cl. ............................................. 198/836.3
[58] Field of Search .................... 198/836.1, 836.3

[56] References Cited

U.S. PATENT DOCUMENTS

| | | | |
|---|---|---|---|
| 4,470,499 | 9/1984 | Sijbrandij | 198/836.3 |
| 5,492,218 | 2/1996 | Falkowski | 198/836.3 |

FOREIGN PATENT DOCUMENTS

| | | | |
|---|---|---|---|
| 2544292 | 10/1984 | France | 198/836.3 |
| 2581439 | 11/1986 | France | 198/836.3 |
| 2808270 | 8/1978 | Germany | 198/836.3 |
| 3445426 | 6/1986 | Germany | 198/836.3 |
| 0087526 | 2/1958 | Netherlands | 198/836.3 |

*Primary Examiner*—James R. Bidwell
*Attorney, Agent, or Firm*—Shlesinger, Fitzsimmons & Shlesinger

[57] ABSTRACT

At each of spaced points therealong a conveyor guide rail is attached to one end of a support the opposite end which is mounted by a manually operable clamp for vertical adjustment on a first member that is mounted by a second clamp for lateral adjustment relative to the conveyor on the horizontal surface of a second member that in turn is mounted for vertical adjustment on one side of the conveyor frame. Confronting serrated surfaces interposed between the two members are releasably engaged to retain the first member in its laterally adjusted position. Graduated scales are provided to help locate the vertical position of the rail support on the first member and the lateral position of the first member on the second member. The rail support is rotationally adjustable about a vertical axis.

17 Claims, 4 Drawing Sheets

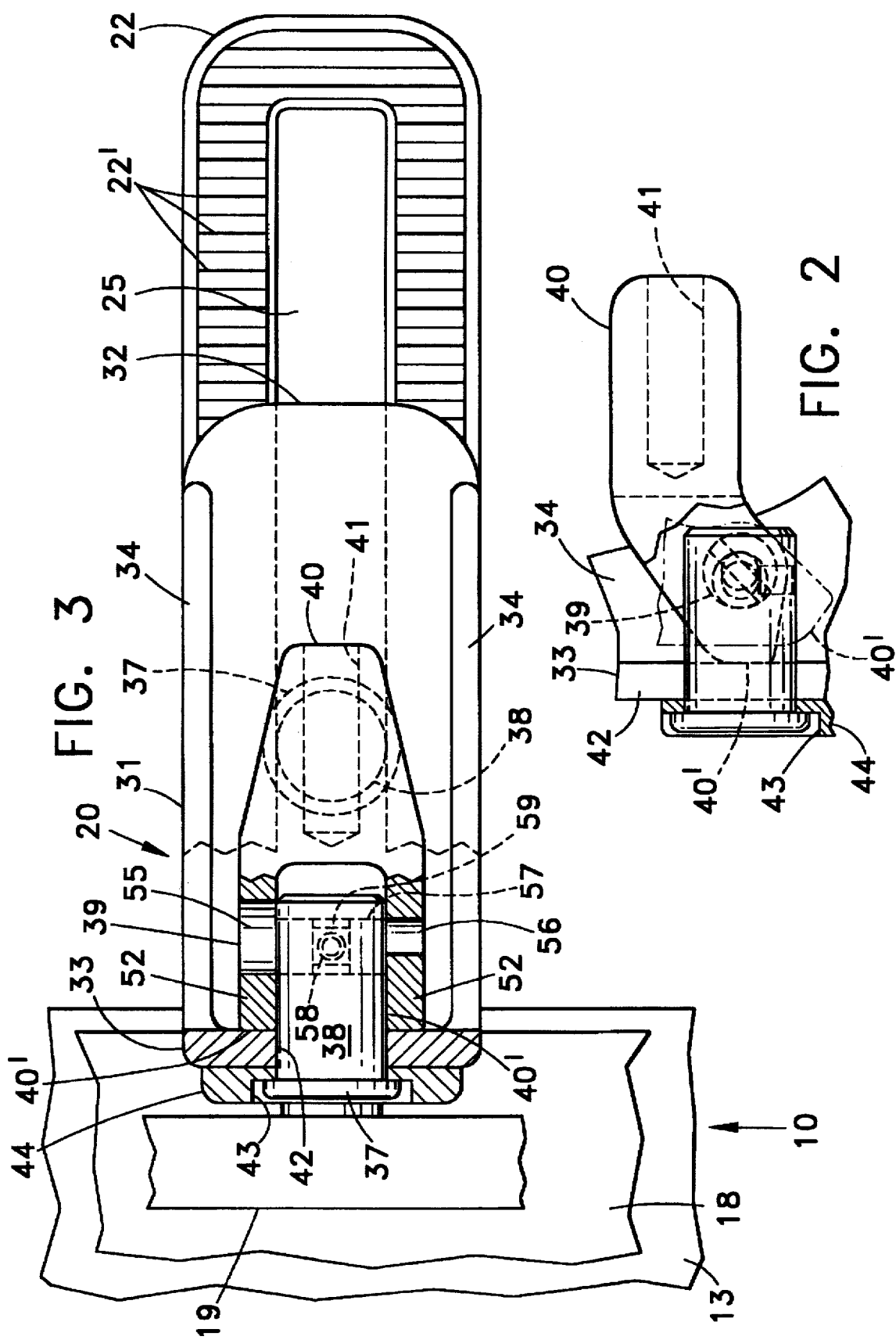

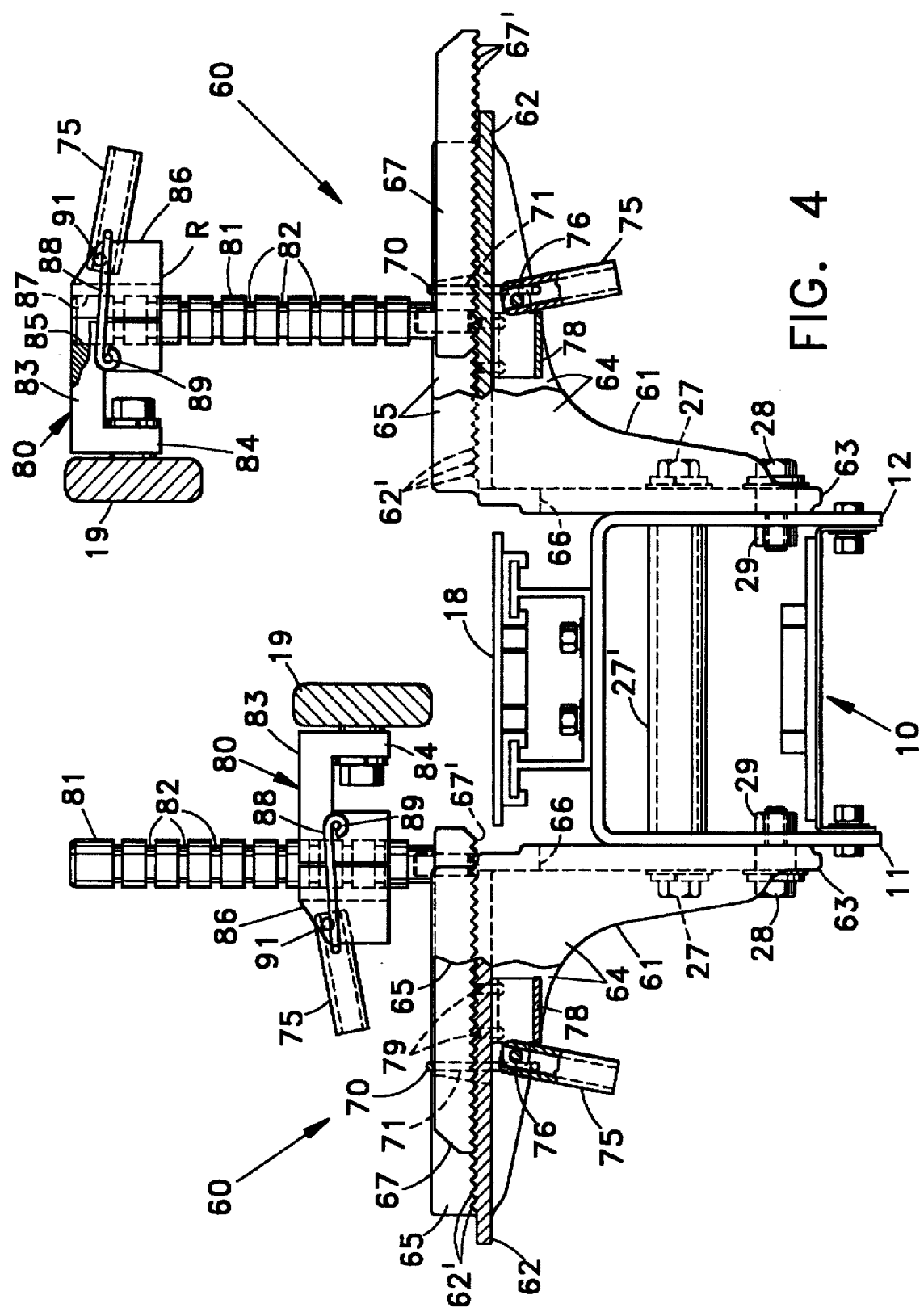

GUIDE RAIL SUPPORTS FOR CONVEYORS AND THE LIKE

BACKGROUND OF THE INVENTION

This invention relates to conveyors, such as belt or chain conveyors and the like for conveying articles such as bottles, cartons and the like, and more particularly this invention relates to improved guide rail supports for such conveyors. More specifically this invention relates to improved, adjustable guide rail supports or brackets of the type described which can be adjusted rapidly and easily without the use of tools, and which provides for positive and accurate presetting such supports.

It heretofore has been customary to provide for some forms of conveyors, adjustable guide rails for guiding the products that are conveyed or transported on the conveyor. U.S. Pat. No. 3,647,051, for example, discloses conveyor guide rails which are adjustable vertically and laterally by virtue of spring-retaining clips which can be manipulated for affecting adjustment of the guide rails. The U.S. Pat. No. 4,932,517 also discloses adjustable side rails for conveyors as does U.S. Pat. No. 3,776,350. Among the disadvantages of prior such apparatus, however, is that it heretofore has been extremely difficult to effect a positive locking of an adjustable guide rail so that, once it has been adjusted into a desired position, it will not tend to be dislodged or shifted out of its desired position during use. Still another disadvantage of prior such apparatus is that there has been no way for accurately pre-setting the guides into known, predetermined positions. In addition while such prior devices have been adjustable vertically and toward and away from a respective side of the conveyor, no satisfactory means has been provided for permitting the guide rails to be swiveled about a vertical axis, when necessary.

Accordingly, it is an object of this invention to provide improved, quickly adjustable guide rails having means for readily and simply adjusting the rails into predetermined, fixed positions in which the side rails will be precluded from being dislodged from the adjusted position or positions.

Still another object of this invention is to provide an improved guide rail supports or brackets of the type described which are relatively inexpensive to manufacture, and which enable adjustment of the supports or brackets into a variety of different positions horizontally, vertically and angularly about a vertical axis, without the use of any special tools.

Other objects of this invention will be apparent hereinafter from the specification and from the recital of the appended claims, particularly when read in conjunction with the accompanying drawings.

SUMMARY OF THE INVENTION

In a conveyor mechanism each guide rail thereof is supported at spaced points therealong by a set of adjustable guide rail supports including a lower, generally right angularly shaped member one leg of which is mounted for vertical adjustment on one side of the conveyor frame and with the other leg thereof extending horizontally and laterally away from the adjacent side of the conveyor. Mounted on the surface of the horizontally disposed leg of the lower support member for adjustment laterally toward and away from the adjacent side of the conveyor is an upper guide rail support element having on the lower surface thereof a laterally extending array of teeth or serrations which extend parallel to the conveyor, and are secured by a manually operable clamp in releasable, meshing engagement of a like array of teeth formed on the confronting surface of the horizontally disposed leg of the lower support member.

Mounted at its lower end on the support element for lateral adjustment therewith, and projecting at its upper end vertically above the adjustable support element is an upper rail supporting member having mounted thereon a rail support secured at one end to an adjacent guide rail, and adjustably mounted at its opposite end by a manually operable clamp for vertical adjustment on the upper rail supporting member between the upper and lower ends thereof.

In one embodiment the upper rail supporting member, and hence the rail supported thereby is rotatably adjustable about a vertical axis relative to the guide rail support element, and in another embodiment the rail support is rotatably adjustable about a vertical axis relative to the upper rail supporting member. In each embodiment graduated scales are formed on both the laterally and vertically adjustable components to enable accurate adjustment or prepositioning of the rails horizontally and vertically.

THE DRAWINGS

FIG. 2 is an enlarged, fragmentary sectional view of the cam lock mechanism shown at the right side of FIG. 1, the lock mechanism being shown fragmentarily and in broken lines as it appears when it is in its unlocked position;

FIG. 3 is an enlarged, fragmentary sectional view of this cam lock mechanism taken generally along the line 3—3 in FIG. 1 looking in the direction of the arrows;

FIG. 4 is a view similar to FIG. 1, but showing the conveyor with two sets of guide rail supports made according to a second embodiment of this invention, the guide rails and portions of the supports again being broken away and shown in section;

DETAILED DESCRIPTION OF THE PREFERRED EMBODIMENTS

Figure 1:
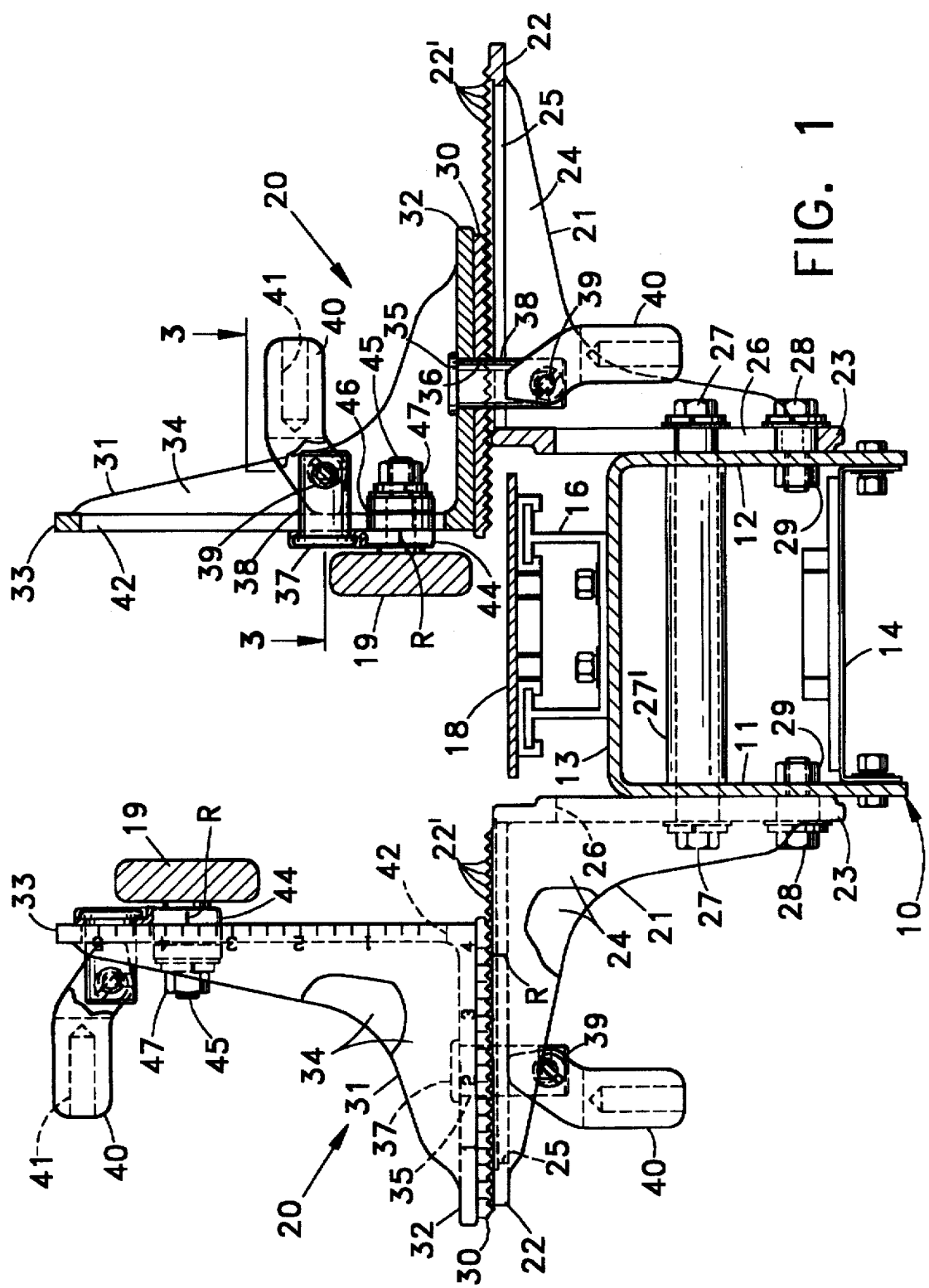
FIG. 1 is an end elevational view of a table top style conveyor having mounted thereon two sets of guide rail supports made according to one embodiment of this invention, the associated guide rails and portions of one set of brackets being broken away and shown in section.

Referring now to the drawings by numerals of reference, and first to FIGS. 1 to 3, 10 denotes generally the elongate, inverted generally U-shaped frame of a conventional table top style conveyor having spaced, parallel side walls 11 and 12, and a horizontally disposed upper wall 13. The lower ends of the frame side walls 11 and 12 are secured by conventional bolts to opposite ends to one or more brackets 14 which extend transversely between side walls 11 and 12. Bolted to the upper surface 13 of the frame 10 is a generally U-shaped bracket 16, which supports in a conventional manner for horizontal travel thereon the conveyor chain or belt 18. The frame 10 and associated conveyor 18 as thus far described are conventional and therefore will not be described in greater detail herein.

In order to make sure that conveyed articles do not accidentally shift or slide off of one side or the other of conveyor 18, it has long been customary to employ along one or both sides of the conveyor 18 elongate guide rails, which in FIG. 1 are denoted by the numerals 19. Guide rails 19 extend longitudinally along or adjacent to opposite sides of the conveyor 18, and depending upon the size and/or height of the products borne by the conveyor 18, it often is necessary to adjust the rails 19 horizontally (laterally) and/or vertically relative to the conveyor 18, as disclosed for example in some of the above-noted prior art patents. Typically the rails 19 are supported at longitudinally spaced points therealong; and in the embodiment shown in FIGS. 1 to 3, the numerals 20 denote, generally, two sets of improved guide rail supports or brackets, each of which sets adjustably supports one of the two guide rails 19. Since each set 20 is identical in construction and operation,like numerals will be employed to denote the various elements of each set.

Each set 20 of the supports comprises a lower, generally right-angularly shaped bracket 21 comprising a pair of leg sections 22 and 23, which intersect each other at right angles, and which have their inner surfaces connected by spaced, parallel web sections 24, which rigidly support the leg sections 22 and 23 at right angles to each other. Intermediate their ends leg sections 22 and 23 of each bracket 21 have therein elongate slots 25 and 26, respectively. Sections 23 of the brackets 21 have plane outer surfaces which are secured in coplanar relation against the outer surfaces of the side walls 11 and 12 of frame 10 by a first set of bolts 27, which extend through the slots 26 adjacent the upper ends thereof, and which thread into opposite ends of an elongate spacer sleeve 27' that extends transversely between the frame walls 11 and 12. Bracket sections 23 are secured adjacent their lower ends to opposite sides of frame 10 by another set of bolts 28 which extend through the slots 26 adjacent the lower ends thereof, and which are secured at their inner ends to nuts 29 which engage the inner surface of the frame walls 11 and 12. By loosening the bolts 27 and 28 the respective lower brackets 21, and hence each set 20 of supports, can be adjusted vertically and independently of one another relative to the respective frame walls 11 and 12, while at all times maintaining the axial lengths of the slots 26 normal to the plane of the conveyor 18, and also positioning the other leg section 22 of each bracket 21 so that sections 22 extend in horizontal planes laterally away from opposite sides of conveyor 18.

As shown more clearly in FIGS. 1 and 3, the outer or upper surfaces of the leg sections 22 of the brackets 21 are serrated or otherwise provided with a plurality of closely spaced, similarly shaped teeth 22', which extend at right angles to the slot 25 in the associated bracket leg, and essentially parallel to the axial lengths of the conveyor 18 and guide rails 19. Mounted on each serrated surface of each bracket leg 22 for lateral adjustment thereon is a swivel locking plate 30 having a serrated lower surface which is a mirror image of the serrated upper surface of the associated bracket leg 22, and which has a plane, upper surface upon which is adjustably mounted one of two, identical brackets 31, which form the other or upper support or bracket of each set 20 thereof. As in the case of the lower brackets 21, each of the upper brackets 31 comprises a pair of integral leg sections 32 and 33, which intersect each other at right angles, and which have the inner surfaces thereof integral with a pair of spaced web sections 34. However, unlike the leg sections 22 of brackets 21, each leg section 32 of each bracket 31 has therein, approximately centrally thereof, a circular opening 35, which registers with a like, circular opening 36 formed in the associated swivel plate 30 centrally thereof, and with the slot 25 in the leg section 22 of the associated bracket 21. A headed pin 37 has a reduced-diameter shank 38 thereof extending through the registering openings 35 and 36 of each leg section 32 and its associated swivel plate 30, through the slot 25 on the supporting leg section 22, and into the space between the two web sections 24 of the underlying bracket 21. The lower end of the shank 38 of each pin 37 is connected by a pin 39 to one of a plurality of locking cams 40 which are described in greater detail hereinafter.

The vertically extending leg section 33 of each upper bracket 31 has therein an elongate slot 42 through which extends the shank 38 of another headed pin 37 the enlarged-diameter head of which is seated in a circular recess 43 (FIG. 3) formed in the upper end of a guide rail mounting block 44, which overlies the outer surface of the associated leg section 33 at opposite sides of its slot 42. Each guide rail 19 is supported in the lower end of its associated mounting block 44 by a shaft 45, which is secured at one end to the inside surface of each guide rail 19, and which projects at its opposite end through registering openings formed in the associated mounting block 44 adjacent its lower end, and in a guide rail block 46 which is mounted for sliding, vertical movement in the associated bracket leg slot 42, and which is secured at its inner end by a nut 47 against block 46.

As shown in FIG. 3, in each upper bracket 31, the shank 38 of each pin 37 extends through the slot 42 in its leg section 33,and into the space between two, spaced, parallel leg sections 52 (FIG. 3) formed on a yoke-shaped end of each locking cam 40. The inner end of each such shank 38 (the end thereof remote from its enlarged head section) is pivotally connected to the associated locking cam 40 by a pin of the type denoted above by numeral 39. Each pin 39 has an enlarged-diameter head section 55 seated in a registering, circular opening formed in one of the leg sections 52 of cam 40, and at its opposite end a reduced diameter section 56 which is seated in a registering, circular opening in the other leg section 52, and coaxially the opening containing the end 55 of pin 39. Intermediate its ends each pin 39 has formed thereon a cylindrical section the axis of which is slightly offset from the axis of the ends 55 and 56 of the associated pin, and which is seated in a registering, circular opening formed diametrally through the shank 38 of the associated pin 37. Pin 39 is fixed in the yoke section of cam 40 and in the shank 38 of the associated pin 37 by a dowel set screw 58, or the like, which is fixed in a radial opening in the shank 38 of a respective pin 37 so that the inner end thereof projects into an annular recess 59 formed in the eccentric section 59 of each pin 39 intermediate its ends.

With this construction, whenever a respective locking cam 40 is swung into an operative, locking position as shown in full lines in FIG. 1, locking surfaces 40' (FIGS. 2 and 3) formed on the terminal ends of the leg sections 52 of the yoke-shaped end of a respective cam 40 will have locking engagement with registering surfaces on the undersides of the associated leg sections 22 to the lower brackets 21, or with registering portions of the leg sections 33 of the upper brackets 31. In FIG. 1 each of the four illustrated locking cams 40 is shown pivoted into its locking position, in which case the teeth or serrations on the undersides of the swivel locking plates 30 are secured in registering engagement with the serrated upper surfaces of the lower brackets 21, thus fixing the upper brackets 31 against lateral movement relative to the lower brackets. At the same time, the guide rails 19 are secured in predetermined vertical positions on the respective upper brackets 31 by their associated locking cams 40. Whenever any one of the locking cams 40 is swung to its released position, as shown for example by broken lines in FIG. 2, the eccentric section 57 of the associated pin 39 causes the yoke-shaped end of the cam to be shifted away from the associated bracket, whereby the associated upper bracket 31 or associated guide rail 19 can be adjusted laterally or vertically, respectively. When the associated upper bracket 31 or guide rail 19 has been shifted into its newly adjusted position, the associated locking cam 40 can then be pivoted back into its locking position. Although each locking cam 40 can be swung manually between its locking and released position, each cam 40 is provided in the end thereof opposite its yoke-shaped end with an axially or longitudinally extending blind bore 41 for accommodating the blade of a screwdriver, or the like, which then may be used for pivoting the respective cam between its locking and unlocking positions, if desired.

To assist in accurate positioning or prepositioning of a respective upper bracket 31 and its associated rail 19 laterally from one side or the other of the conveyor 18, each of the upper brackets 31 has inscribed on each of the opposed side edges of its horizontally disposed leg section 32 and associated swivel plate 30 a graduated scale denoted in FIG. 1 by the numerals 1, 2, 3 and 4, which are printed or otherwise applied to the side edge of the leg section 32 shown at the left hand side of FIG. 1. In addition, a graduated scale is also marked upon or otherwise applied to each of the side edges of the vertically disposed section 33 of each upper bracket 31, again as represented in FIG. 1 by the numerals 1 through 5 which are marked on the illustrated edge of the leg section 33 of the bracket 31 shown at the left hand side of FIG. 1. While bracket 31 shown at the right side of FIG. 1 is shown in section, it is to be understood that each such bracket 31 would bear graduated scales of the type noted above. The graduated scales on the brackets 31 make it possible accurately to reposition the lateral position of each bracket 31 on its associated lower, supporting bracket 21 simply by releasing the associated cam member 40 and shifting the associated swivel plate 30 and its attached upper bracket 31 laterally on the lower bracket until the desired numerical designation registers with a reference point R formed on the opposed edges of the leg section 22 of each lower bracket 21. Similarly the rails 19 can be adjusted vertically until a reference point R on the associated mounting block 44 registers with the desired number on the vertical scales formed on a respective upper bracket 31.

Still another advantage of this construction is that, when the locking cams 40 on the lower brackets 21 are in their unlocked or released positions, the associated upper brackets 31 can be swung or pivoted about the vertical axes of the associated lower pins 37 relative to the underlying swivel plates 30; and this adjustment can be made independently of the lateral adjustment of the plates 30 on the bracket legs 22. This enables the guide rails 19 to be correspondingly shifted about the axes of the associated lower pins 37, a feature which is very desirable in most cases where the guide rails 19 are made of flexible material, and are designed to be other than rigid guides following a straight, linear path. Further than this, of course, simply by first releasing the bolts 27 and 28, a respective lower bracket 31 can be shifted vertically on frame 10 thereby to effect corresponding vertical adjustment of each pair of brackets 21 and 31 forming a respective set 20 of brackets.

Figure 5:
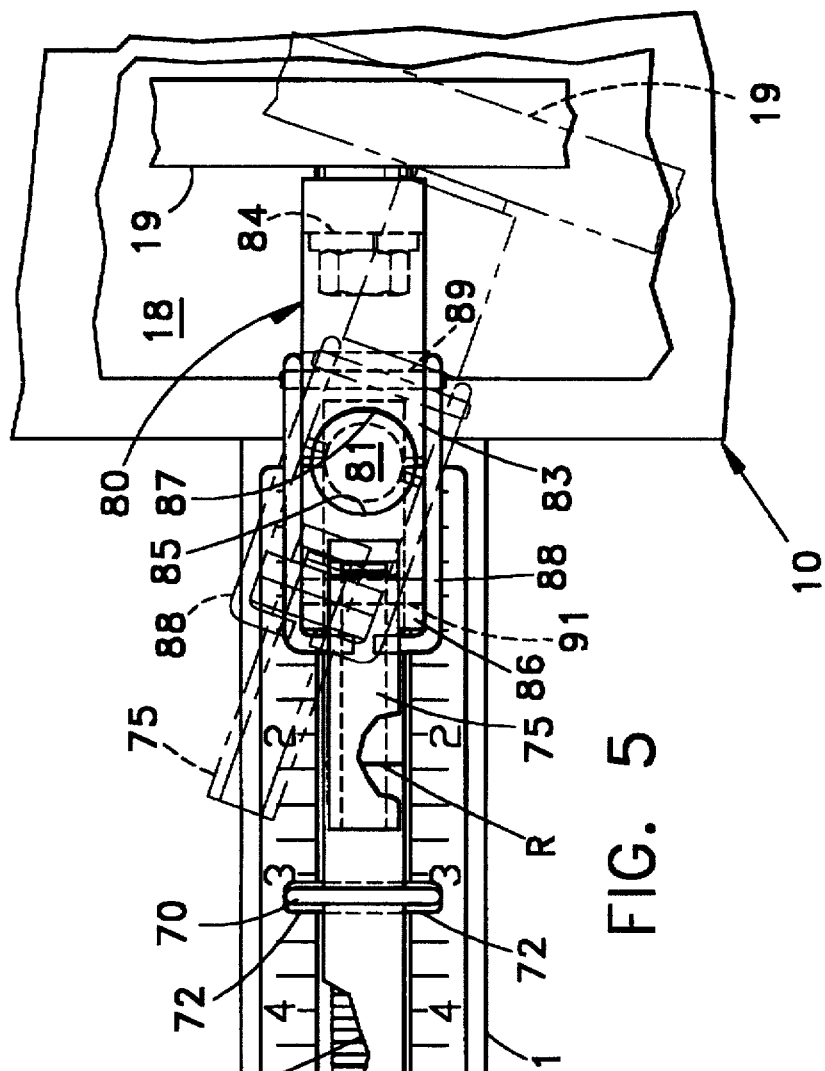
FIG. 5 is an enlarged, fragmentary plan view looking down on the set of guide supports as shown in FIG. 4.
Figure 6:
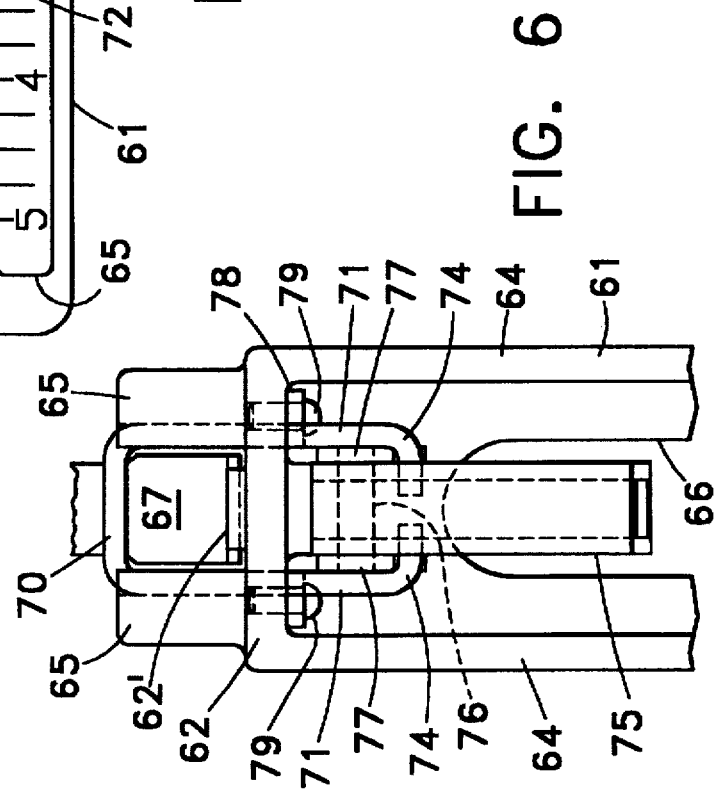
FIG. 6 is an enlarged, fragmentary end elevational view as seen when looking at the left end of the assembly as shown in FIG. 4.

Referring now to the embodiment shown in FIGS. 4 to 6, wherein like numerals are employed to denote elements similar to those employed in the first embodiment, numerals 60 denote generally two sets of rail guide supports which are similar in configuration. Each set 60 comprises a generally right angular bracket 61, having s pair of integral legs 62 and 63 which intersect each other at right angles, and which have their inside surfaces integral with and connected by a pair of spaced, parallel web sections 64. As in the first embodiment, each of the vertically disposed leg sections 63 has therein intermediate its ends an elongate slot 66 by means of which bracket legs 63 of the brackets 61 are adjustably secured against the outer surfaces of the frame legs 11 and 12 by the bolts 27 which thread into the spacer sleeve 27' and by the bolts 28 which are fastened by nuts 29 to frame legs 11 and 12 adjacent the lower ends thereof. Therefore, as in the first embodiment, brackets 61 are adjustable vertically on frame 10 by loosening and then tightening the bolts 27 and 28.

However, unlike the first embodiment, the horizontally disposed bracket leg sections 62 do not have therethrough elongate slots. Instead, each bracket leg section 62 has integral therewith, and projecting from its upper surface adjacent the longitudinal side edges thereof, a pair of spaced, parallel side wall sections which are generally rectangular in cross section, and which have printed or otherwise formed on the upper surfaces thereof linear, graduated scales as denoted for example in FIG. 5 by the numerals 2, 3, 4 and 5 and the graduations therebetween. Although these graduations are shown only for bracket 61 at the left side of FIG. 4, it will be apparent that similar such graduations are formed on the upper surface of the side walls 65 of the bracket 61 illustrated at the right side of FIG. 4. Each leg section 62 also has formed on the upper surface thereof between its sidewalls 65, spaced, parallel serrations or teeth 62', which are similar in configuration and in function with the teeth 22' formed in the upper surfaces of the bracket leg sections 22 of the first embodiment. Also as in the first embodiment, the spaced teeth 62' are disposed in spaced, parallel relation to each other and extend generally parallel to the length of the conveyor 18 and for substantially the full length of the associated leg section 62.

Mounted on the upper surface of each bracket leg 62 between its spaced wall sections 65, and for adjustment longitudinally of its associated array of teeth or serrations 62', is an elongate rail supporting member 67 which is generally rectangular in cross section, and which has formed on the underside thereof a plurality of spaced, parallel serrations or teeth 67' that are similar to and engaged in meshing relationship with the teeth 62' of the underlying bracket leg 62. As noted hereinafter, member 67 is adjustable into different positions on its associated bracket leg 62, and for that purpose has inscribed or otherwise formed on its upper surface a reference mark or line R (FIG. 5) which is readable against the graduations formed on the upper surfaces of the sidewall sections 65 on each leg section 62.

In order to lock or otherwise secure a respective member 67 in an adjusted position on the serrated surface of the associated leg section 62, each member 67 extends beneath the closed, upper end of an inverted, generally U-shaped bail or clamp 70 having spaced, parallel leg sections 71, which extend downwardly through registering grooves 72 (FIG. 5) formed on confronting surfaces of the associated bracket leg wall sections 65, and through registering openings in the associated leg section 62 into the space between the latter's spaced web sections 64. The lower ends of the bail or clamp leg sections 71 are bent inwardly as at 74 (FIG. 6) and are seated in circular openings formed in opposite sides, respectively, of an elongate, hollow clamping handle 75, which thus is pivotal intermediate its ends about the ends 74 of the respective bail 70. At its upper end, as shown in FIGS. 4 and 6, each bail 70 is mounted to pivot about a pin 76, opposite ends of which are secured in a pair of spaced, registering ears or lugs 77 (FIG. 6) that project from opposite sides of an inverted, generally U-shaped clamp supporting plate 78 that is secured by a plurality of screws 79 to the underside of a respective bracket leg 62.

When the clamping handles 75 for the bails 70 are swung about pins 76 to the positions shown in FIG. 4, the associated bails 70 are drawn downwardly into locking engagement with the tops of the associated rail supporting members 67, as the lower ends 74 of the associated bails are swung clockwise about their respective pivot pins 76. To release the bails 70 relative to the members 67, the associated clamp handles 75 are swung slightly counterclockwise about the associated pins 76, thereby permitting slight elevation of the closed ends of the associated bails upwardly relative to the members 76 so that the latter can be adjusted laterally on the associated bracket legs 62 selectively toward and away from the conveyor 18. Once the members 67 are in the desired positions the clamping handles 75 need only be swung manually clockwise back to their locking or clamping positions. In such positions the confronting, engaged teeth or serrations 62' and 67' prevent any further, lateral movement of a member 67 relative to its supporting leg section 62.

Secured at its lower end to each supporting member 67 adjacent the inner end thereof (the end nearest the conveyor 18) is a vertically disposed, cylindrical side rail supporting post or column 81. Each post 81 has formed thereon, and coaxially thereof, a plurality of like, equi-axially spaced annular recesses or notches 82. Mounted for vertical adjustment on each column 81 is a two-piece side rail supporting bracket denoted generally by the numeral 80. Each bracket 80 comprises a rail supporting plate 83 having one of the guide rails 19 bolted or otherwise fastened to a flange 84 which projects from the underside of the plate 83 at the end thereof facing the conveyor 18. At its opposite end plate 83 has therein a semi-circular recess 85, which overlies and is coaxially seated against one diametral side of the associated post 81 adjacent its upper end. A second plate 86 has in one end thereof a semi-circular recess 87 which overlies and is disposed in coaxial engagement with the side of the associated post 81 diametrally opposite that of the recess 85 in plate 83, and is adjustably secured in that position by a bail or clamp 88, the legs of which are pivotally connected at one end thereof by a pin 89 to the plate 83, and at the opposite ends thereof to a hollow clamping handle 75 identical in configuration to the handles 75 employed in connection with the bails 70.

Each of the clamping handles 75 associated with the two-piece brackets 80 is pivotally mounted at one end thereof by a pin 91 to plate 86 to pivot about such pin in a space formed in the end of the plate 86 remote from the end containing the arcuate recess 87. In this manner, each time that one of the clamping handles 75 associated with a respective bracket 80 is swung clockwise into the locking position as shown in FIG. 4, the arcuate recesses 85 and 87 formed in the plates 83 and 86, respectively, are drawn snugly against diametrally opposite sides of the associated post 81, thereby fixing the associated bracket 80, and hence the associated side rail 19 in a predetermined vertical position on the associated post 81. When the handles 75 associated with the brackets 80 are swung counterclockwise, the associated bails or clamps 88 release the radial pressure exerted on the associated plates 83 and 86, and the plates 83 and 86 are allowed to separate slightly to permit vertical adjustment of the associated bracket 80 on its column 81. Thereafter, of course, the associated clamping handles can be swung clockwise back to their locking positions as shown in FIG. 4. Since the annular recesses 82 formed in each column 81 are equi-spaced axially of the associated column, they constitute, in effect, a graduated, vertical scale for each bracket 80 and its associated column 81. As shown in FIG. 4, the lower edges of the two plates 83 and 86 forming a respective bracket 80 register vertically with each other, and therefore can function as a reference R readable against the annular recesses 82 in the associated column 81, thereby to provide a scale for placing each bracket 80 and its associated side rail 19 in a predetermined vertical position on the associated column 81.

From the foregoing it will be apparent that the present invention provides relatively simple and inexpensive means for readily and adjustably mounting the side rails of a conveyor of the type described. In each embodiment, the means employed for mounting the associated rails can be readily adjusted laterally with respect to opposite sides of the associated conveyor 18, and each mounting means also can be readily adjusted angularly about an axis extending normal or vertically with respect to the conveyor 18. Moreover, in each case, the associated clamping members can be manipulated manually, without the need for any special tool, although if desired the stem of a screwdriver or the like could be inserted into the bore of an associated clamping member 40 or 75 to assist in pivotal movement thereof between its clamping and released position. In addition, the horizontal and vertical adjustments of the rail supporting means have associated therewith graduated scales which enable both the horizontal and vertical adjustments to be made accurately, and enable presetting of the associated guide rail to a predetermined position. This considerably reduces the time and effort involved in adjusting the associated guide rails repeatedly into different positions depending upon the different times at which similar goods will be conveyed by the associated conveyor 18.

Moreover, while this invention has been illustrated and described in detail in connection with only certain embodiments thereof, it will be apparent that it is capable of still further modification, and that this application is intended to cover any such modifications as may fall within the scope of one skilled in the art, or the appended claims.

I claim:

1. In a conveyor mechanism having a frame and a conveyor mounted to travel generally horizontally adjacent a guide rail on the frame, improved means for adjustably supporting said guide rail on the frame, comprising a first member mounted for vertical adjustment on one side of said frame and having thereon a horizontal support surface extending laterally away from said conveyor and said one side of said frame, means mounting a second member on said horizontal surface of said first member for lateral adjustment relative to said first member, and respectively toward and away from said conveyor and said one side of said frame, said mounting means including a third member interposed between confronting surfaces on said first and second members, respectively, and having thereon a serrated surface extending parallel to said horizontal support surface on said first member, and being releasably engaged with a complimentary serrated surface formed on one of said confronting surfaces on said first and second members, said mounting means further including first clamping means movable manually between an inoperative position in which said serrated surfaces are disengagable to permit lateral adjustment of said second member on said first member, and an operative position in which said members and said serrated surfaces are releasably locked together, thereby releasably to secure said second member in a predetermined lateral position on said first member,
a fourth member secured at one end to a said guide rail, and
further clamping means adjustably mounting said fourth member at its opposite end on said second member for lateral adjustment therewith and for vertical adjustment thereon relative to said conveyor.

2. In a conveyor mechanism as defined in claim 1, wherein one of said second and fourth members, respectively, is rotatably adjustable about an axis extending normal to said horizontal support surface on said first member.

3. In a conveyor mechanism as defined in claim 1, wherein said complimentary serrated surface is formed on said horizontal support surface of said first member, and
said second and third members are adjustable laterally and in unison on said first member when said first clamping means is moved to its inoperative position.

4. In a conveyor mechanism as defined in claim 3, wherein said second member is mounted for rotational adjustment about a vertical axis relative to said first and third members when said first clamping means is moved to its inoperative position.

5. In a conveyor mechanism as defined in claim 3, wherein
said second member is fixed to said third member for lateral adjustment therewith, and
said fourth member is mounted on said second member for rotational adjustment about a vertical axis.

6. In a conveyor mechanism as defined in claim 1,
means operatively defining with respect to said second member a graduated scale extending vertically of said second member, and
an observable reference point formed on said fourth member and disposed to register with different graduations of said scale upon adjustment of said fourth member and the attached guide rail vertically relative to said conveyor.

7. In a conveyor mechanism as defined in claim 1,
means operatively defining with respect to one of said first and second members a graduated scale extending horizontally in the direction in which said second member is adjustable laterally relative to said first member, and
an observable reference point formed on the other of said first and second members, respectively, and disposed to register with different graduations on said scale upon adjustment of said second member laterally on said first member.

8. In a conveyor mechanism as defined in claim 1, wherein
each of said first and second members comprises a right angular bracket having two leg sections intersecting each other at right angles,
one of said leg sections of said first member is secured for vertical adjustment to said one side of said frame, and the other leg section thereof extends horizontally away from said one side of said frame and has formed thereon said complimentary serrated surface, and
said second member has one of said two leg sections thereof extending horizontally over said horizontally extending leg section of said first member, and has the other leg section thereof extending vertically above said one leg section thereof adjacent one side of said conveyor.

9. In a conveyor mechanism as defined in claim 8, wherein
said other leg section of said second member has therein a vertical slot, and
said opposite end of said fourth member is mounted by said further clamping means for vertical adjustment in said slot.

10. In a conveyor mechanism as defined in claim 8, wherein
said third member comprises a plate interposed between said horizontally extending leg sections of said first and second members,
said plate is laterally adjustable with said second member on said horizontal leg section of said first member and has one of said serrated surfaces formed on one side thereof and releasably engaged with said complimentary serrated surface on the horizontal leg section of said first member.

11. In a conveyor mechanism as defined in claim 10, wherein said one leg section of said second member is supported on the opposite side of said plate for lateral adjustment therewith and for rotational adjustment thereon about a vertical axis.

12. In a conveyor mechanism as defined in claim 1, wherein
said complimentary serrated surface is formed on said horizontal support surface of said first member,
said serrated surface on said third member is formed on the underside thereof and is releasably engaged with and is laterally adjustable on said complimentary surface on said first member, and
said second member is mounted on said third member for lateral adjustment with said third member relative to said first member.

13. In a conveyor mechanism as defined in claim 12, wherein
said second member is cylindrical in configuration and has a lower end secured to said third member and an upper end extending vertically above said third member,
said fourth member has in said opposite end thereof a generally semi-circular recess, and
said further clamping means releasably retains said semi-circular recess in said fourth member coaxially against one diametral side of said second member both for vertical adjustment on said second member, and for rotational adjustment about the axis thereof.

14. In a conveyor mechanism as defined in claim 13, wherein said further clamping means comprises
a fifth member having in one end thereof a generally semi-circular recess complimentary to and releasably engaged with the side of said second member diametrally opposite said fourth member,
a clamp operating member pivotally mounted adjacent one end thereof on said fifth member adjacent the opposite end thereof, and for pivotal movement manually in opposite directions between clamping and release positions, respectively, and
a clamp attached at one end to said fourth member and at its opposite end to said operating member, and operative releasably to draw said one end of said fourth and fifth members into locking engagement with said second member releasably to prevent vertical movement of said fourth member on said second member.

15. In a conveyor mechanism as defined in claim 1, wherein said first clamping means comprises a pin having a cylindrical shank extending through registering openings in said first, second and third members, and transversely of said serrated surfaces, said pin having at one end of said shank an enlarged diameter head overlying a portion of said second member, and projecting at its opposite end beyond said first member, and a locking cam mechanism pivotally mounted intermediate its ends on said opposite end of said shank for pivotal movement manually into and out of an operative position in which said first, second and third members are locked together between said cam mechanism and the head of said pin.

16. In a conveyor mechanism as defined in claim 15, wherein one of said registering openings comprises an elongate slot formed in one of said first and second members, respectively, and is operative to permit lateral adjustment of said second member relative to said first member and said pin when said locking cam mechanism has been pivoted out of its operative position.

17. In a conveyor mechanism as defined in claim 1, wherein said first clamping means comprises a generally U-shaped bail having a closed end overlying part of one of said second and third members, respectively, and having a pair of spaced, parallel leg sections extending at their lower end downwardly through registering openings in said horizontal support surface on said first member, and transversely of said serrated surfaces, and a clamp operating member pivotally connected to the lower ends of said bail leg sections and pivotal manually in one direction to lock said second member against lateral adjustment on said first member, and pivotal in the opposite direction to allow disengagement of said serrated surfaces and lateral adjustment of said second member on said first member.

* * * * *